(12) United States Patent
Hackett

(10) Patent No.: US 7,822,106 B2
(45) Date of Patent: *Oct. 26, 2010

(54) ENHANCED RAKE STRUCTURE

(75) Inventor: William C. Hackett, Doylestown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1246 days.

This patent is subject to a terminal disclaimer.

(21) Appl. No.: 10/793,025

(22) Filed: Mar. 4, 2004

(65) Prior Publication Data

US 2004/0170220 A1    Sep. 2, 2004

Related U.S. Application Data

(63) Continuation of application No. 10/034,874, filed on Dec. 27, 2001, now Pat. No. 6,771,693.

(51) Int. Cl.
H04B 1/69 (2006.01)
(52) U.S. Cl. .................................. 375/148; 375/130
(58) Field of Classification Search ............. 375/148, 375/143, 142, 150, 130, 133, 134, 136, 137, 375/147, 335, 342, 441
See application file for complete search history.

(56) References Cited

U.S. PATENT DOCUMENTS

| | | | |
|---|---|---|---|
| 4,164,628 A | 8/1979 | Reilly et al. | |
| 5,535,412 A | 7/1996 | Nadehara | |
| 5,903,550 A | 5/1999 | Spock | |
| 5,930,288 A * | 7/1999 | Eberhardt | 375/148 |
| 6,011,787 A | 1/2000 | Nakano et al. | |
| 6,078,611 A | 6/2000 | La Rosa et al. | |
| 6,081,549 A | 6/2000 | Shou et al. | |
| 6,192,066 B1 | 2/2001 | Asanuma | |

(Continued)

FOREIGN PATENT DOCUMENTS

JP    2001-345739    12/2001

(Continued)

OTHER PUBLICATIONS

Harju et al., "A Flexible Rake Receiver Architecture for WCDMA Mobile Terminals", Third IEEE Signal Processing Workshop on Signal Processing Advances in Wireless Communications, Taoyuan, Taiwan, Mar. 2001, pp. 9-12.

(Continued)

*Primary Examiner*—Chien M Fan
*Assistant Examiner*—Aristocratis Fotakis
(74) *Attorney, Agent, or Firm*—Volpe and Koenig, P.C.

(57) ABSTRACT

A rake architecture for a frequency division duplex (FDD) and use also in TDD and TD-SCDMA type communications system, designed to significantly reduce the memory capacity required and thereby also reduce an area on the die of an application specific integrated circuit (ASIC) into which the memory is integrated. A single circular buffer, preferably of the shared memory type is shared by all of the rake fingers of a rake receiver to significantly reduce the hardware and software required to time align multipath signals received by a UE from a base station. This unique time alignment technique also reduces the number of code generators required to track a plurality (typically three) of base stations.

19 Claims, 4 Drawing Sheets

U.S. PATENT DOCUMENTS

| | | | |
|---|---|---|---|
| 6,215,814 B1 | 4/2001 | Ylitalo et al. | |
| 6,269,075 B1 | 7/2001 | Tran | |
| 6,282,234 B1 | 8/2001 | Kameno et al. | |
| 6,442,193 B1 | 8/2002 | Hirsch | |
| 6,445,714 B1 | 9/2002 | d'Anjou et al. | |
| 6,985,516 B1* | 1/2006 | Easton et al. | 375/150 |
| 7,031,737 B1* | 4/2006 | Braam et al. | 455/518 |
| 7,123,647 B1* | 10/2006 | Sheng | 375/150 |
| 2002/0037027 A1* | 3/2002 | Medlock et al. | 375/147 |
| 2002/0126745 A1* | 9/2002 | Prysby et al. | 375/148 |
| 2002/0176489 A1* | 11/2002 | Sriram et al. | 375/150 |

FOREIGN PATENT DOCUMENTS

| | | |
|---|---|---|
| JP | 2003-087221 | 3/2003 |
| JP | 2003-115821 | 4/2003 |
| JP | 2004-072418 | 3/2004 |
| TW | 466840 | 12/2001 |
| TW | 466841 | 12/2001 |
| WO | 00/59123 | 10/2000 |

OTHER PUBLICATIONS

Harju et al., "A Flexible Rake Receiver Architecture for WCDMA Mobile Terminals", Third IEEE Signal Processing Workshop on Signal Processing Advances in Wireless Communications, Taoyuan, Taiwan, pp. 9-12, (Mar. 2001).

Harju et al., "A Flexible Rake Receiver Architecture for WCDMA Mobile Terminals", Third IEEE Signal Processing Workshop on Signal Processing Advances in Wireless Communications, Taoyuan, Taiwan, pp. 9-12, (Mar. 2001).

* cited by examiner

ENHANCED RAKE STRUCTURE

CROSS REFERENCE TO RELATED APPLICATION

This application is a continuation of U.S. patent application Ser. No. 10/034,874, filed Dec. 27, 2001, which is incorporated by reference as if fully set forth.

BACKGROUND

The present invention relates to a rake architecture employed in CDMA communication systems. More particularly the invention relates to a rake architecture employing a shared memory designed to significantly reduce the memory capacity required and thereby also reduce a die area of an application specific integrated circuit (ASIC) for the rake architecture without any reduction in system capabilities. The architecture may be employed in all types of communication systems employing a rake receiver including, but not limited to, frequency division duplex (FDD), time division duplex (TDD), and time division-synchronous code division multiple access (TD-SCDMA).

Rake receivers are utilized in many types of communications systems. In the wide band code division multiple access (W-CDMA) type of system, a base station transmits primary and secondary sync codes as well as a common pilot channel (CPICH), the pilot signal being unique to each base station. Wireless mobile units (UEs) then receive and synchronize to these codes in order to establish and support a communication.

Referring to FIG. 3, a simplified block diagram of a conventional code tracker 10 is shown. Each rake finger is provided with a code tracker 10. A code generator 12 is provided with a code for a specific base station. The code timing must be offset to compensate for the current time offset from the start of the frame for the assigned peak. An interpolator and decimator filter 14 produces early, late and punctual outputs at 14c, 14b and 14a respectively. The early and late outputs are utilized to keep the punctual output centered in the chip time.

The early, late and punctual outputs are despread with the code for the specific base station at 18, 16 and 20 respectively. The early and late despread signals undergo integration and dumping at integration and dumping devices 22 and 24, squaring at squaring devices 26 and 28 and are summed at 30 to produce an error signal e (t).

FIG. 1 shows the basic timing of a frame. One ten millisecond (10 m sec) synchronization channel (SCH) radio frame is divided into fifteen (15) slots labeled zero (0) through fourteen (14). Each base station transmits a primary sync code and a secondary sync code as well as a common pilot channel (CPICH). Unlike the primary and secondary sync codes that are present only during the first 256 chips of each slot, the CPICH is present during the entire frame and repeats every frame, in addition to being unique for each base station. The rake finger locator uses this uniqueness to perform a correlation against the CPICH from each of the possible base stations in the area of the UE. After the correlation is performed, the rake finger locator determines which peak to assign to which finger of the rake receiver. As was mentioned hereinabove, each UE is typically required to track up to three (3) or more base stations, which capability is due to handover requirements.

Referring to FIG. 3, a simplified block diagram of a conventional code tracker 10 is shown. Each rake finger is provided with a code tracker 10. A code generator 12 is provided with a code for a specific base station. The code timing must be offset to compensate for the current time offset from the start of the frame for the assigned peak. An interpolator and decimator filter 14 produces early, late and punctual outputs at 14c, 14b and 14a respectively. The early and late outputs are utilized to keep the punctual output centered in the chip time.

The early, late and punctual outputs are despread with the code for the specific base station at 18, 16 and 20 respectively. The early and late despread signals undergo integration and dumping at integration and dumping devices 22 and 24, squaring at squaring devices 26 and 28 and are summed at 30 to produce an error signal e (t).

Referring to FIG. 4, a conventional rake structure comprising of six (6) rake fingers is shown. Since all of the rake fingers are substantially identical in design and function, only one is shown in detail in FIG. 4, for purposes of simplicity. As was set forth hereinabove, the code tracker 10 shown in FIG. 3, and also shown in simplified block diagram form in FIG. 4, produces a punctual output 14a (see FIG. 3) which is fed into a delay element 52 which is preferably a circular buffer having a read port and a write port. A memory write pointer 54 increments the memory contents at a chip rate to locations where a punctual input is written and continually points to the next chip location within buffer 52. A read pointer 56 also increments at the chip rate, but is offset from the write pointer 54 based at the number of chips offset from the referenced slot timing. The fine offset is obtained from the code offset circuitry 56 which receives the chip offset at 56a, an output from the code tracker at 56b and the output from code generator 58 at 56c, providing a fine offset for further adjustments of the memory read pointer 56. The buffer 52 provides a time aligned output. It should be understood that the remaining rake fingers "2" through "6" operate in a similar fashion.

FIG. 2 shows a typical multipath. Each of the higher value points represents a multipath.

Each of the punctual outputs is fed into separate time delay elements (not shown) of the rake receiver. The purposes of time delay elements is to remove the time ambiguity, shown in FIG. 2, from the various multipaths. All of the energy remaining after code tracking is then summed in a data estimator (not shown) and is despread and descrambled into symbols.

Referring to FIG. 4, a conventional rake structure comprising of six (6) rake fingers is shown. Since all of the rake fingers are substantially identical in design and function, only one is shown in detail in FIG. 4, for purposes of simplicity. As was set forth hereinabove, the code tracker 10 shown in FIG. 3, and also shown in simplified block diagram form in FIG. 4, produces a punctual output 14a (see FIG. 3) which is fed into a delay element 52 which is preferably a circular buffer having a read port and a write port. A memory write pointer 54 increments the memory contents at a chip rate to locations where a punctual input is written and continually points to the next chip location within buffer 52. A read pointer 56 also increments at the chip rate, but is offset from the write pointer 54 based on the number of chips offsets from the referenced slot timing. The fine offset is obtained from the code offset circuitry 56 which receives the chip offset at 56a, an output from the code tracker at 56b and the output from code generator 58 at 56c, providing a fine offset for further adjustments of the memory read pointer 56. The buffer 52 provides a time aligned output. It should be understood that the remaining rake fingers "2" through "6" operate in a similar fashion.

SUMMARY

The main advantage of the present invention resides in providing an apparatus and method to share the (possibly) many small memories needed to align the tracked multipaths and to move the shared memories ahead of the code tracker. Although the alignment of the multipaths and tracking of their movement is still performed by the code tracker, the code tracker now receives its data from a shared buffer of input symbols versus the more conventional method of sending the input stream to all code trackers and requiring that each code tracker buffers the results and then provides the required delay to obtain alignment.

The invention utilizes a circular buffer, preferably in the form of a shared memory, and has a memory read pointer for each rake finger to provide an offset from the location at which the memory write pointer writes the data, with the offset being associated with each rake finger receiving a multipath component. Each multipath component is sent to its assigned rake finger to undergo code tracking. Since the multipaths are all aligned, the codes are also time aligned, enabling a single code generator to be shared among the code trackers of all of the rake fingers. This novel apparatus and method enable a three-to-one savings in memory as well as reducing the number of code generators required for the rake receiver.

BRIEF DESCRIPTION OF THE DRAWING(S)

The method and apparatus of the present invention would be better understood upon a consideration of the drawings, in which.

DETAILED DESCRIPTION OF THE PREFERRED EMBODIMENT(S)

Figure 1:
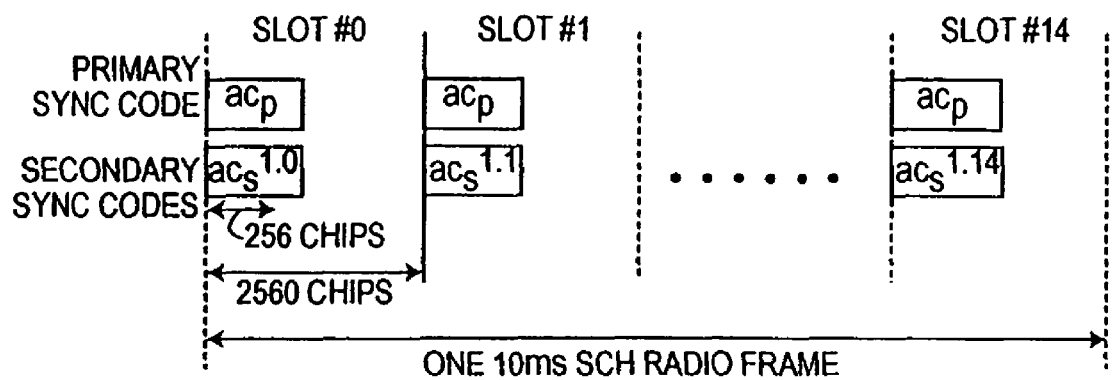
FIG. 1 shows a typical 10 millisecond SCH radio frame.

The present invention will be described with reference to the drawing figures where like numbers represent like elements throughout.

Figure 5:
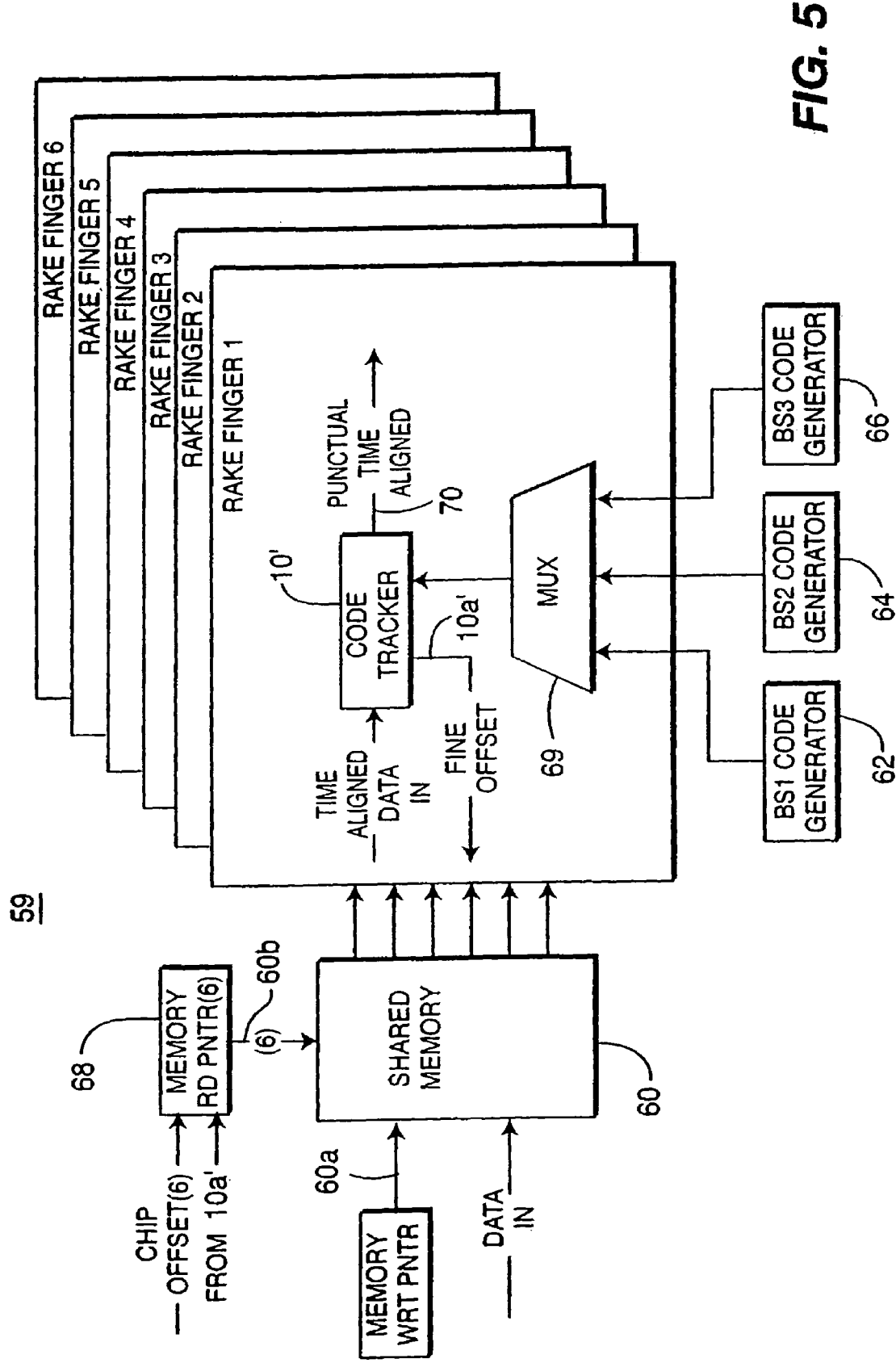
FIG. 5 is a simplified block diagram showing apparatus for time aligning multipath signal for the rake fingers of a rake receiver and embodying the principles of the present invention.

FIG. 5 shows a rake receiver 59 embodying the principles of the present invention and which comprises six (6) rake fingers, only of one of which (i.e. "rake finger 1") is shown in detail for purposes of simplicity. It should be understood that the remaining rake fingers "2" through "6" are similar in design and function. It should be noted that the number of rake fingers is not a requirement of the invention, but is only used herein as a means to explain how the various components operate.

The rake receiver 59 utilizes a circular buffer 60, preferably of the shared memory type, operating at twice the chip rate and having a write pointer 60a and six read pointers 60b, (shown as a single lead for purposes of simplicity). The rake receiver 59 performs time alignment by initially moving the multipath pilot signals from the same base station into alignment prior to undergoing code tracking.

Figure 2:
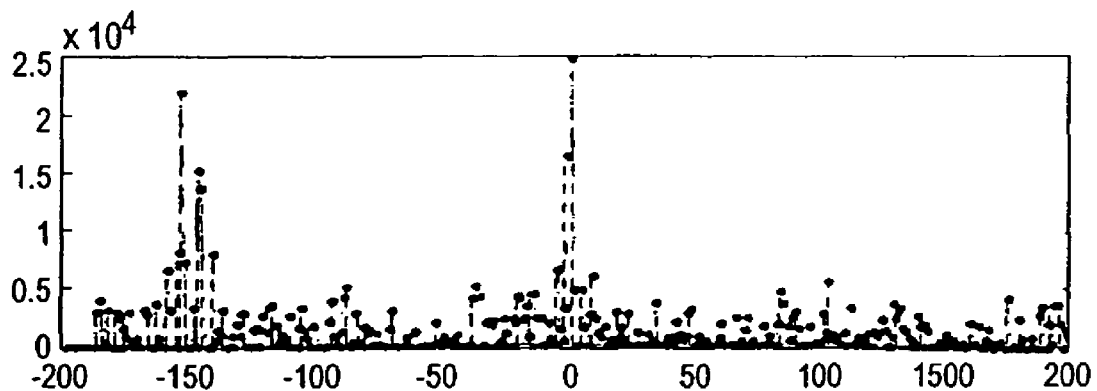
FIG. 2 is a plot showing a typical multipath.
Figure 3:
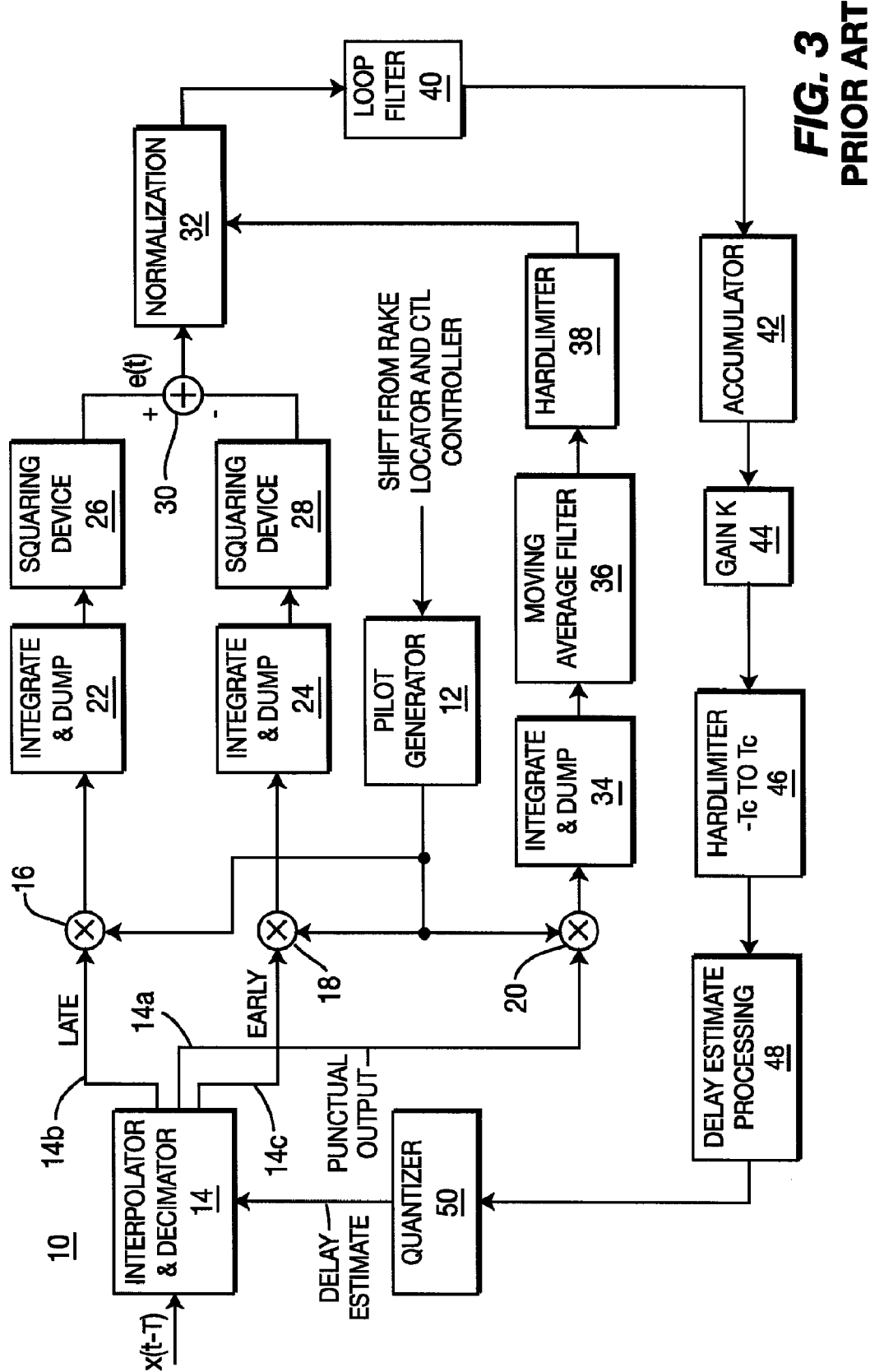
FIG. 3 is a simplified block diagram of a conventional code tracker employed in each rake finger of a rake receiver.

Making reference to FIG. 2, and assuming that the peaks from the higher Hierarchical Golay Correlation (HGC) are all from the same base station and are all capable of being shifted in time to line up on top of each other, once the offset is accomplished each multipath component is sent to its assigned rake finger and code tracking is performed. Assuming receipt of two (2) signals that are five (5) chips apart, let it be assumed that each dot of the multipath plot is a chip time. Assuming that the read and write pointers in FIG. 5 operate at the chip rate, by advancing the read pointer 68 by a count of five (5), the two (2) signals can be read out of the memory at the same time. The chip offsets provided to the read pointer 68 are each associated with one of the rake fingers (1 through 6). The locations of the peaks shown in FIG. 2 are known. The spacing and the number of multipaths are employed to determine the offset amount for the read pointers.

Since the multipath components have been lined up, the codes are also time aligned and the desired code generator (i.e. one of 62, 64 and 66) can be shared among the code trackers 10' of each of the six (6) rake fingers 1 through 6. Three code generators 62, 64 and 66 are provided for respectively generating pseudo-random noise (PN) codes for the three base stations BS1, BS2 and BS3, to be tracked by the UE having the rake receiver shown in FIG. 5. A multiplexer 69 selectively couples the desired code generator to the code trackers 10' by multiplexer 69.

When the code trackers 10' of the rake fingers request the code generator, 62 for example, to change to one of 64 or 66, the memory read pointer 68 for the rake fingers associated with that code generator are adjusted. The read point corresponding to that code tracker 10' is incremented, or decremented by 1. The unique memory sharing arrangement of the present invention enables the use of a single memory 60 shared by all six (6) rake fingers, resulting in three-to-one savings in memory based on the fact that, although there is only one shared memory for all six rake fingers, the shared memory (60) operates at twice the chip rate, since the code tracker 10' requires two samples per chip.

Figure 4:
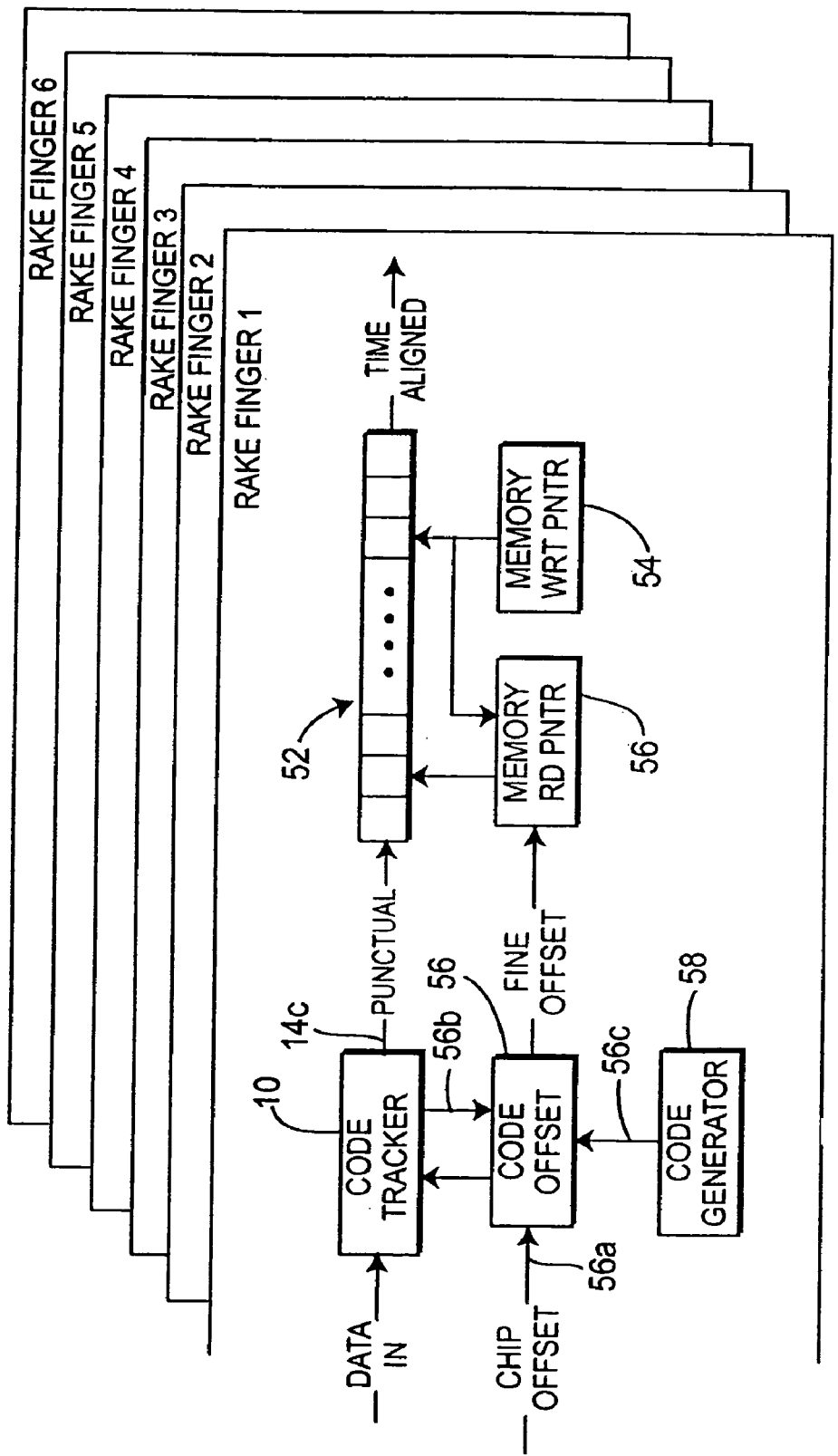
FIG. 4 is a simplified block diagram showing a conventional code tracker employed in each rake finger of a rake receiver.

The code tracker 10' thus provides a punctual time aligned output 70 according to the base station code being decoded. The code tracker 10' which also includes the code offset circuit 56 shown in FIG. 4, provides the fine offset output 10a' to the memory read pointer 68 in a manner similar to that described hereinabove with regard to FIG. 4.

What is claimed is:

1. Apparatus for use in a rake receiver for time aligning multipath signals from a base station, comprising:
   a plurality of rake fingers, each rake finger having a code tracker;
   at least three code generators each generating codes associated with a given base station, said codes being different from one another;
   said time aligning apparatus, comprising a shared memory for selectively providing time aligned multipath signals to code trackers of each rake finger;
   a memory write pointer for writing multipath signals into the shared memory at a given location;
   a memory read pointer for reading out multipath signals to each rake finger from a memory location of a shared memory offset from said given location, each rake finger having a given offset associated therewith and which is provided to the memory read pointer;
   one of said code generators providing a base station code in common to all of the code trackers of said rake fingers due to alignment of the multipath signals;

each of said code trackers receiving one of the outputs read out by said read pointer to perform code tracking; and each of said code trackers providing a fine offset to said memory read pointer for adjusting an offset between said memory write pointer and memory read pointer for providing a time aligned output.

2. The apparatus of claim 1 further comprising a multiplexer for selectively coupling one of said base station code generators to the code trackers of each rake finger.

3. The apparatus of claim 1 wherein said shared memory is a circular buffer.

4. The apparatus of claim 2 wherein the offset between said memory read pointer and said memory write pointer is determined by chip offsets and said fine offsets.

5. The apparatus of claim 4 wherein each chip offset is associated with one of said rake fingers.

6. The apparatus of claim 1 further comprising means for changing the memory read pointer responsive to the code generator coupled to the code tracker of each rake finger.

7. The apparatus of claim 1 wherein three code generators are provided.

8. The apparatus of claim 7 wherein said code generators are selectively coupled to a code tracker by a multiplexer.

9. The apparatus of claim 1 wherein chip codes transmitted to said rake receiver from a base station operate at a predetermined chip rate, said read and write pointers operating at twice the chip rate.

10. The apparatus of claim 1 further comprising means for incrementing the write pointer to successive memory locations.

11. The apparatus of claim 10 wherein said incrementing means increments the write pointer to a start location in the memory means when the write pointer has been incremented to an end location in the memory means.

12. A method for time aligning multipath signals preparatory to applying the multipath signals to a plurality of code trackers provided in fingers of a rake receiver comprising:
providing a shared memory for operation as a circular buffer;
receiving multipath signals from a base station;
writing multipath signals into the shared memory starting at a given memory location and incrementing locations at which the multipath signals are written into said shared memory;
providing a chip offset and a fine offset associated with each rake finger to a memory read pointer;
reading multipath signals written into said shared memory at a location offset from locations at which signals were written into the memory responsive to a chip offset associated with each rake finger and representing a number of chip offsets from a referenced timing slot; and
selectively coupling the signals read out from the memory to each code tracker of each rake finger according to a chip offset associated with each rake finger so that all of the code trackers receive their multipath signals at the same time to enable code tracking and coupling one of a plurality of code generators to all of the code trackers through a multiplexer to enable all of the rake fingers to perform code tracking at the same time.

13. The method of claim 12 further comprising;
the code generators each generating a different code;
selectively coupling one of the code generators to the code trackers of each rake finger for performing a correlation against a signal received from the base station to provide a punctual time aligned signal at each rake finger through the use of a single shared memory and a code generator which are shared by all of said rake fingers.

14. The method of claim 12 wherein said read and write operations of said memory are operated at twice a chip rate of a sync code received from a base station and being processed by the rake receiver.

15. The method of claim 12 further comprising;
coupling each signal fed from the shared memory to a code tracker of a given rake finger according to a chip offset associated with each rake finger.

16. The method of claim 12 wherein each code tracker converts data received from the base station by correlation against the code from the code generator.

17. The method of claim 15 wherein said chip offsets for adjusting the read out locations of the shared memory relative to the write-in location is determined according to rake finger associated with each chip offset.

18. The method of claim 15 wherein each code tracker generates a fine offset responsive to correlation of a signal processed by the code tracker to provide a further adjustment of the offset between the memory read locator and the memory write location.

19. A method for providing time alignment of multipath signals received by a rake receiver from a given base station, said rake receiver having a plurality of rake fingers, comprising:
receiving encoded multipath signals from said base station;
writing said signals into a given location in a shared memory;
reading said signals from a location in the shared memory at an offset from the write-in location responsive to a given chip offset and a fine offset associated with each rake finger and provided to a memory read pointer so that the signals are time aligned when read out of the shared memory;
coupling one of a plurality of code generators to all of the code trackers through a multiplexer to enable all of the rake fingers to perform code tracking at the same time; and
said base station transmitting signals to said rake receiver at a given chip rate, said shared memory operating at twice said chip rate when reading into and writing out of said shared memory.

* * * * *